US008689983B1

(12) United States Patent
Ripley

(10) Patent No.: US 8,689,983 B1
(45) Date of Patent: Apr. 8, 2014

(54) APPARATUS AND METHODS FOR VACUUM OPERATED SORTING

(76) Inventor: Heather Lynn Ripley, Haines, AK (US)

( * ) Notice: Subject to any disclaimer, the term of this patent is extended or adjusted under 35 U.S.C. 154(b) by 56 days.

(21) Appl. No.: 13/341,384

(22) Filed: Dec. 30, 2011

Related U.S. Application Data

(60) Provisional application No. 61/428,322, filed on Dec. 30, 2010.

(51) Int. Cl.
*A47J 43/22* (2006.01)
*A47L 9/10* (2006.01)
*A47L 9/02* (2006.01)
*B01D 50/00* (2006.01)

(52) U.S. Cl.
USPC ............... 209/372; 209/405; 15/347; 15/418; 55/327; 55/326; 55/325

(58) Field of Classification Search
USPC ......... 209/370–372, 405; 15/415.1, 418, 422, 15/347; 55/309, 318, 315, 323, 325, 326, 55/327, 328
See application file for complete search history.

(56) References Cited

U.S. PATENT DOCUMENTS

| 954,164 | A | * | 4/1910 | Broekema | 15/350 |
| 2,293,920 | A | | 8/1942 | Replogle | |
| 3,267,650 | A | | 8/1966 | Lundin | |
| 4,833,753 | A | * | 5/1989 | Muller | 15/339 |
| 5,375,293 | A | * | 12/1994 | Gilbertson | 15/339 |
| 5,411,150 | A | | 5/1995 | Sigurdsson | |
| 5,667,080 | A | | 9/1997 | Klein | |
| 6,101,670 | A | * | 8/2000 | Song | 15/339 |
| D494,327 | S | * | 8/2004 | Song | D32/21 |
| D496,601 | S | * | 9/2004 | Song | D10/83 |
| 7,357,823 | B1 | * | 4/2008 | Streciwilk | 55/337 |
| 2002/0178696 | A1 | * | 12/2002 | Korff | 55/337 |

* cited by examiner

*Primary Examiner* — Patrick Cicchino
(74) *Attorney, Agent, or Firm* — Middleton Reutlinger

(57) ABSTRACT

Methods and apparatus for vacuum operated sorting. The apparatus may include a plurality of casing members each having a passageway with a filter member across the passageway. The casing members may be removably coupled to one another in a desired order and/or quantity and attached to a vacuum source to provide sorting of objects such as beads into a plurality of size ranges.

20 Claims, 7 Drawing Sheets

APPARATUS AND METHODS FOR VACUUM OPERATED SORTING

CROSS-REFERENCE TO RELATED DOCUMENTS

This application claims the benefit of U.S. Provisional Application No. 61/428,322, filed Dec. 30, 2010, and entitled "Bead Vacuum."

TECHNICAL FIELD

The present invention is directed generally to a sorting device that utilizes a fluid flow to sort objects. More particularly, various inventive methods and apparatus disclosed herein relate to separating beads into a plurality of size ranges.

BACKGROUND

Jewelry makers or other craft makers who utilize beads or other small objects often desire to sort or otherwise organize such objects by size. They may also desire to clean up beads or other small objects that may be on a floor, table, and/or other surface while simultaneously separating such objects from other debris and/or sorting such objects by size.

SUMMARY

The present disclosure is directed to inventive methods and apparatus for sorting objects. For example, in some embodiments a sorting device is provided that includes a plurality of casing members each including a passageway and a filter across the passageway for sorting out objects that are larger than a predetermined size. The casing members may be arranged so that the passageways of the casing members are all in flow communication with one another and the filters are sequentially arranged to progressively sort out smaller objects. The sorting device may be attached to a vacuum source such that a flow is created through the passageways and in the direction of the sequentially arranged filters for progressively sorting out smaller objects.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
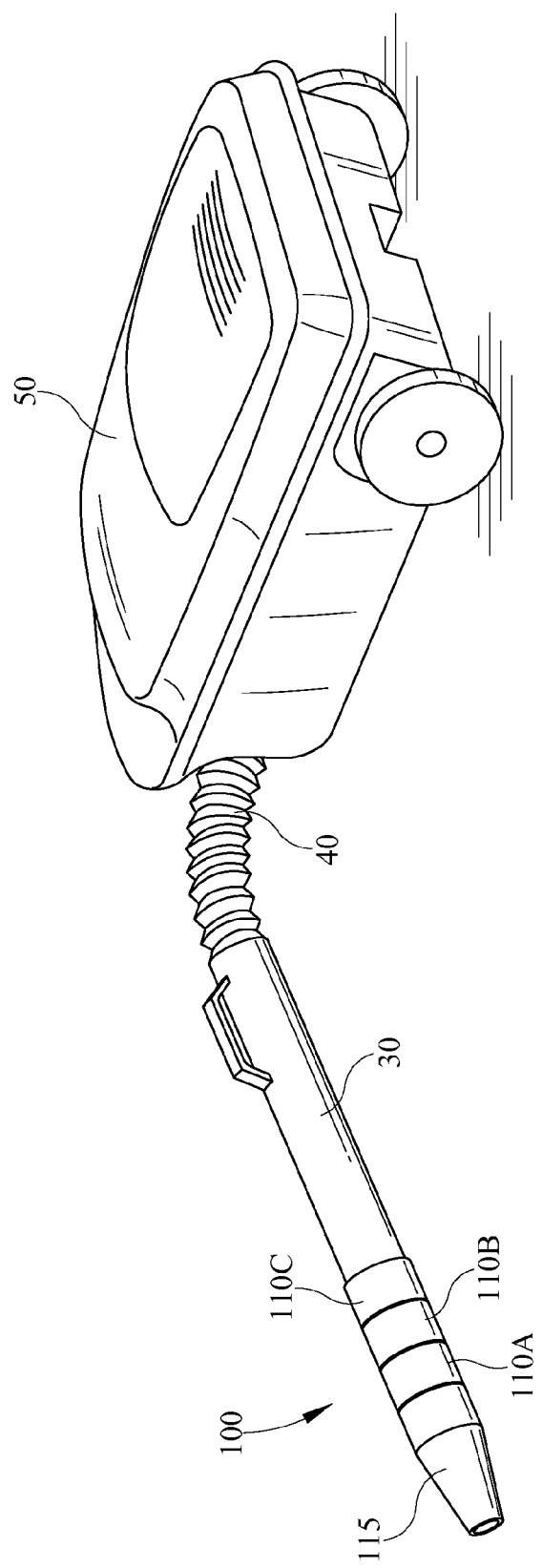
FIG. 1 illustrates a first embodiment of a sorting device attached to a vacuum.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, certain embodiments of the sorting device disclosed herein are particularly well suited for utilization in combination with a standard household vacuuming device such as, for example, an attachment hose of a stand-alone vacuum device and/or a hose of a central vacuum. However, one or more aspects of the sorting device described herein may be utilized in combination with other vacuum devices and implementation of the one or more aspects described herein in combination with alternatively configured vacuum devices is contemplated without deviating from the scope or spirit of the claimed invention. For example, in some embodiments the sorting device may be provided in combination with a standalone battery powered vacuum device, optionally specifically configured for utilization with the sorting device.

In some embodiments the sorting device may include plurality of casing members that may be removably coupled with one another in series. The casing members each define a passageway to allow air, water, or other fluid flow through the casing member. Each casing member may also include a filter structure that intersects the passageway and includes a plurality of openings of substantially the same size to allow one or more objects smaller than a predetermined size to pass through the filter structure while preventing objects equal to or larger than the predetermined size from passing through the filter structure. The casing members may be sequentially arranged and inserted into a fluid flow so that the filter structures thereof progressively allow smaller size objects to pass therethrough in the direction of the fluid flow, thereby allowing sorting of objects into a plurality of size ranges. In some embodiments the casing members may be nestable within one another. In some versions of those nestable embodiments the casing members may each contain an upper portion and a lower portion of unique cross-section. In some versions of those nestable embodiments the casing members may additionally or alternatively be tapered along at least a portion thereof.

Referring initially to FIGS. 1 through 3C, a first embodiment of a sorting device 100 is illustrated. The sorting device 100 is illustrated connected downstream of a vacuum tube 30 extending from a flexible hose 40 of vacuum cleaner 50. The first embodiment of the sorting device 100 includes a plurality of casing members 110A-C that are attached to one another in series and an upstream attachment 115 that is coupled to the casing members 110A-C. The illustrated upstream attachment 115 has a frustoconcial shape and is provided as a component of the sorting device 100. The sorting device 100 may additionally or alternatively be configured for attachment with other upstream attachments. For example, in some embodiments one or more upstream attachments that may be provided with the vacuum cleaner 50 may additionally or alternatively be utilized. For example, a crevice tool, dusting brush, and/or upholstery nozzle may be utilized in lieu of or in addition to (e.g. connected to the upstream attachment 115) the upstream attachment 115. Also, for example, in some embodiments a flexible upstream attachment may be provided such as a flexible crevice tool or an attachment having a frustoconical shape with a narrower end that may be flexibly adjusted to a plurality of positions. One of ordinary skill in the art, having had the benefit of the present disclosure, will recognize and appreciate that in other embodiments the upstream attachment may be omitted and/or other upstream attachments may also optionally be utilized.

The casing members 110A-C and the upstream attachment 115 form an air passageway that is in communication with the air passageway through the vacuum tube 30 and the flexible hose 40. Accordingly, when the vacuum 50 is operated and drawing air through the vacuum tube 30 and flexible hose 40, air is also drawn through the sorting device 100. The illustrated embodiment of casing members 110A-C are coaxially aligned with one another and interposed between the vacuum tube 30 and the upstream attachment 115. When assembled, the casing members 110A-C form a cylindrical tube having a substantially flush, smooth, and continuous exterior surface. One of ordinary skill in the art, having had the benefit of the present disclosure will recognize and appreciate that in other embodiments one or more of the casing members 110A-C may generally define other shapes, such as, for example, substantially cubic, rectangular, triangular, hexagonal, octagonal, and/or oval. Also, one of ordinary skill in the art, having had the benefit of the present disclosure, will recognize and appreciate that in some embodiments the casing members 110A-C may be non-coaxial and/or non-flush with one another. For example, in some embodiments one or more of the casing members 110A-C may have an exterior surface that is distinct from and non-flush with other casing members 110A-C. Also, for example, in some embodiments one of the casing members 110A-C may be offset and non-coaxial with the other casing members 110A-C.

Figure 2A:
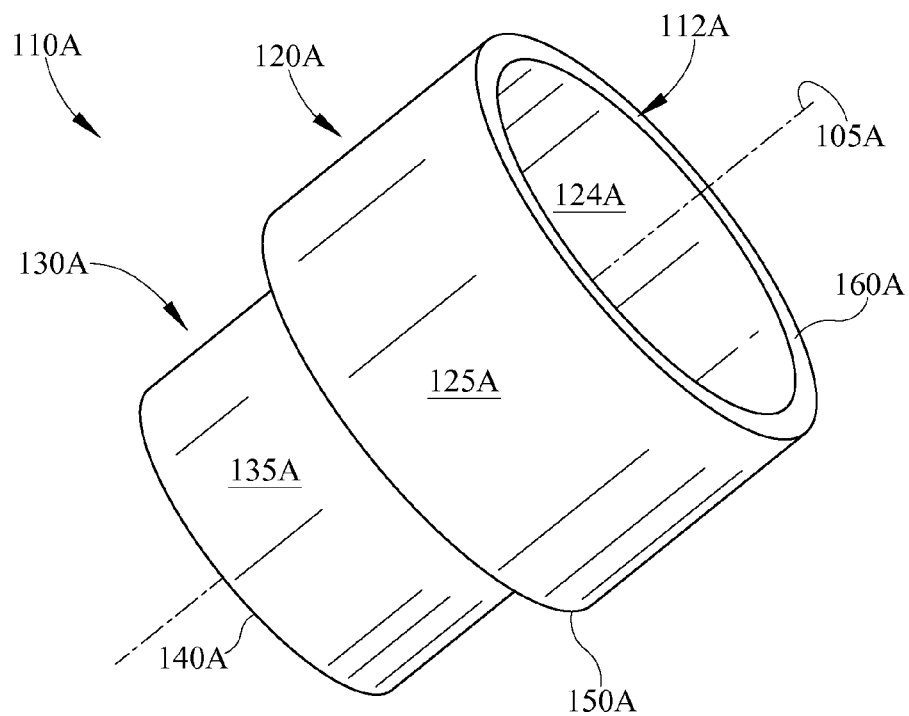
FIG. 2A illustrates a perspective view of a first casing member of the sorting device of FIG. 1.
Figure 2B:
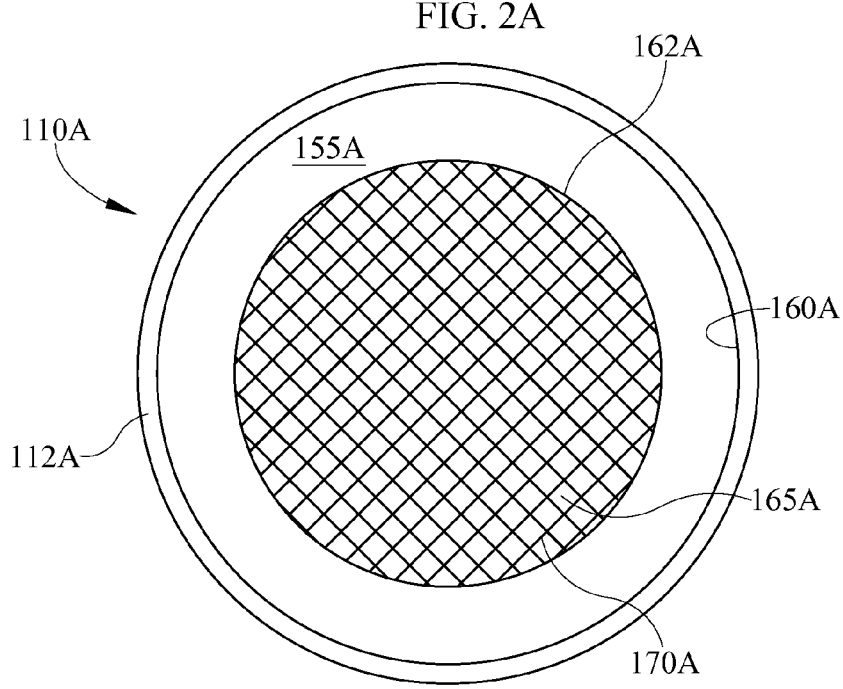
FIG. 2B is a top view of the first casing member of FIG. 2A.

Referring now to FIGS. 2A and 2B, one of the casing members 110A is illustrated in additional detail. FIG. 2A illustrates a perspective view of the casing member 110A and FIG. 2B illustrates a top view of the casing member 110A. FIG. 2A also illustrates a longitudinal axis 105A of the casing member 110A. The casing member 110A surrounds the longitudinal axis 105A and defines an airflow passageway aligned along the longitudinal axis. The passageway extends from an upper opening 160A (FIG. 2A) of an upper portion 120A of the casing member 110A to an opposed lower opening 162A (FIG. 2B) of a lower portion 130A of the casing member 110A.

The upper portion 120A is substantially cylindrical and includes a top surface 112A surrounding the upper opening 160A, an upper portion interior surface 124A, an upper portion exterior surface 125A, and a bottom lip 150A. The lower portion 130A is also substantially cylindrical and includes a top surface 155A, a lower portion interior surface (not illustrated), a lower portion exterior surface 135A, and a bottom surface 140A surrounding the lower opening 162A. The upper portion 120A has an exterior radius as measured from the longitudinal axis 105A to the upper portion exterior surface 125A and an interior radius as measured from the longitudinal axis 105A to the upper portion interior surface 124A. The lower portion 130A has an exterior radius as measured from the longitudinal axis 105A to the lower portion exterior surface 135A and an interior radius as measured from the longitudinal axis 105A to the lower portion interior surface. In the illustrated embodiment, the exterior radius of the upper portion 120A is larger than the exterior radius of the lower portion 130A, thereby forming the bottom lip 150A on the lower surface of the upper portion 130A. Also, in the illustrated embodiment, the interior radius of the upper portion 120A is larger than the interior radius of the lower portion 130, thereby forming the top surface 155A of the lower portion 130A.

As illustrated in FIG. 2B, the casing member 110A contains a filter member 170A. The filter member 170A spans the passageway of the casing member 110A and is positioned substantially perpendicular to the longitudinal axis 105A. In alternative embodiments the filter member 170A may block the passageway and be at a non-perpendicular angle relative to the longitudinal axis 105A. The filter member 170A is mesh like and contains a plurality of members that form a plurality of openings 165A. The filter member 170A may be made of one or more of a variety of materials including, for example, one or more of wire, plastic, metal, fiberglass, rubber, wood, string, thread, and/or yarn. The plurality of openings 165A are each substantially the same predetermined size so as to block objects that are greater than or equal to that predetermined size from passing through the filter member 170A.

In the illustrated embodiment the filter member 170A is attached across the bottom surface 140A of the lower portion 130A and covers the lower opening 162A. In alternative embodiments the filter member 170A may be located elsewhere across the passageway of the casing member 110A. For example, in some embodiments the filter member 170A may be located across the top surface 155A of the lower portion 130A, may be provided between the bottom surface 140A and the top surface 155A, or may be provided between the lower portion top surface 155A and the upper portion top surface 112A. In some embodiments the filter member 170A may be glued screwed, nailed, tacked, welded (e.g., plastic welding or metal welding), or otherwise coupled to the casing member 110A. For example, in some embodiments the filter member 170A and the casing member 110A may be cohesively formed (e.g., formed from a single mold, formed of two separate pieces that have been cohesively welded together). In the illustrated embodiment the filter member 170A is substantially planar and cylindrical. However, in other embodiments the filter member 170A may take on other general shapes such as, for example, cupped, rounded, stepped, and/or non-cylindrical (optionally in combination with a non-cylindrically passageway). Although filters having substantially square openings are illustrated in the Figures, one of ordinary skill in the art, having had the benefit of the present disclosure, will recognize and appreciate that in other embodiments other shapes of openings may additionally or alternatively be included in one or more of the filters. For example, in some embodiments all the openings of all the filters may be annular.

Figure 3A:
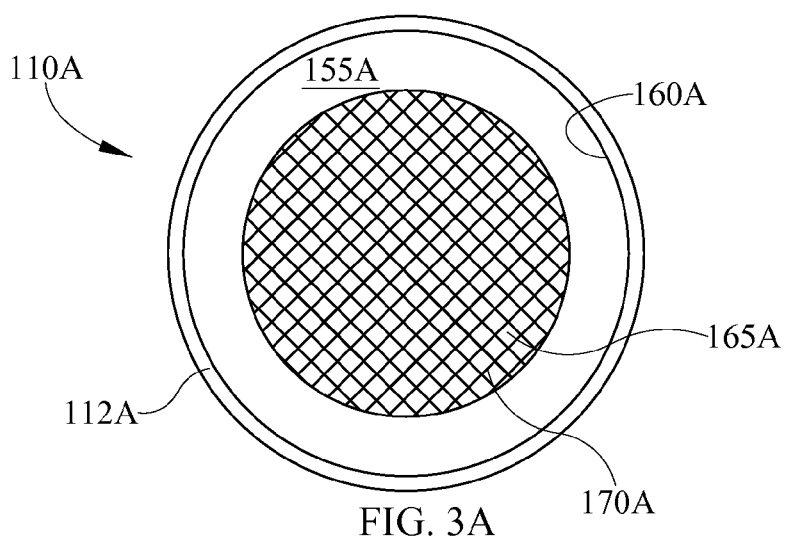
FIG. 3A is another top view of the first casing member of FIG. 2A.
Figure 3B:
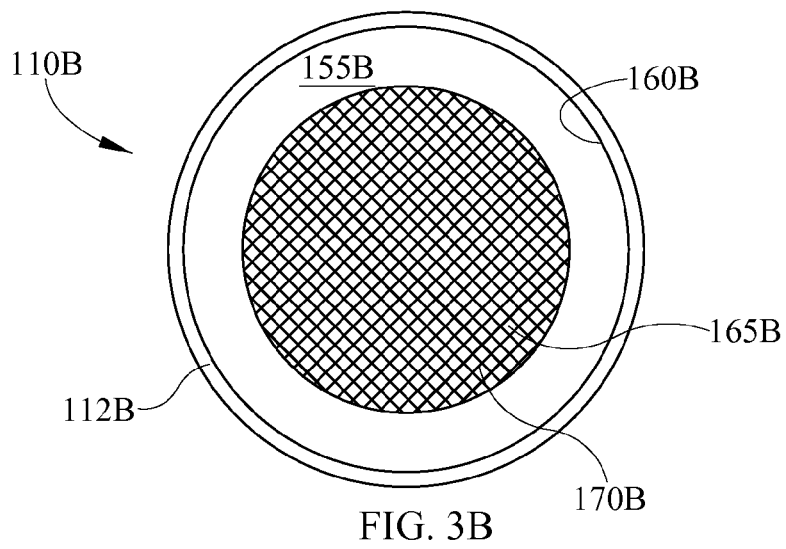
FIG. 3B is a top view of a second casing member of the sorting device of FIG. 1.
Figure 3C:
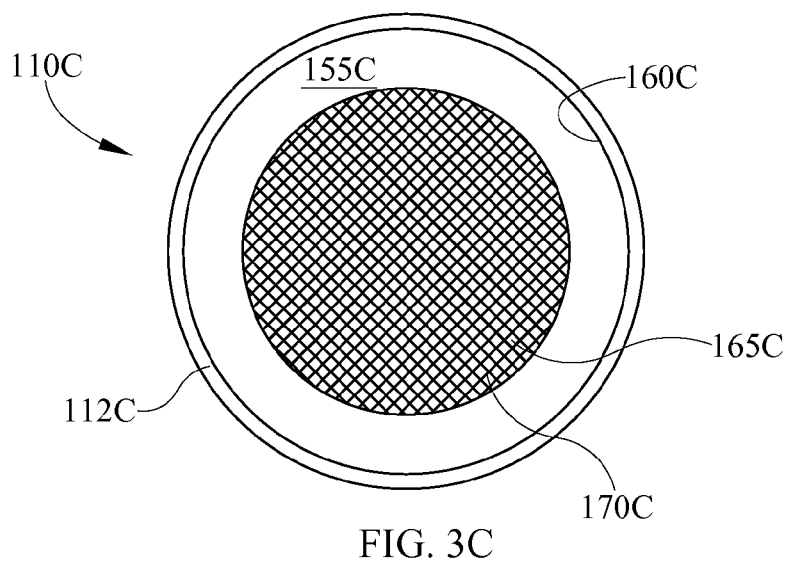
FIG. 3C is a top view of a third casing member of the sorting device of FIG. 1.

In the illustrated embodiment of the sorting device 100, each of the casing members 110A-C share a substantially common configuration, with the only exception being that each casing member 110A-C has a unique filter 170A-C. FIGS. 3A through 3C illustrate top views of respective of casing members 110A-C. FIGS. 3A through 3C are presented in the same scale relative to one another. In FIG. 3A, each opening 165A is substantially the same first size as each other opening 165A illustrated in FIG. 3A. In FIG. 3B, each opening 165B is substantially the same size as each other opening 165B illustrated in FIG. 3B. In FIG. 3C, each opening 165C is substantially the same size as each other opening 165C illustrated in FIG. 3C.

However, comparing the casing members 110A-C illustrated in FIGS. 3A through 3C, the openings 165A depicted in FIG. 3A are larger than the openings 165B depicted in FIG. 3B, and each opening 165B depicted in FIG. 3B is larger than each opening 165C depicted in FIG. 3C. The casing member 110A be coupled to the casing member 110B and the casing member 110B may be coupled to the casing member 110C so that, when placed serially into a stream of fluid flow, the casing member 110A is located upstream from the casing member 110B and the casing member 110B is located upstream from the casing member 110C. In this arrangement, the passageways of the casing members 110A-C are in flow communication and filter member 170A prevents objects larger than the openings 165A from passing through it, the filter member 170B prevents objects larger than the openings 165B from passing through it, and the filter member 170C prevents objects larger than the openings 165C from passing through it. Accordingly, the plurality of casing members 110A-C may be arranged according to the size of the openings 165A-C of the filters 170A-C thereof so that objects moving in a fluid flow extending through the passageways of the filters 170A-C may be sorted by size.

As discussed, in the illustrated embodiment of the sorting device 100, each of the casing members 110A-C share a substantially common configuration, with the only exception being that each casing member 110A-C has a unique filter 170A-C. Accordingly, the perspective view of casing member 110A in FIG. 2A is also an accurate depiction of the illustrated embodiment of the casing members 110B and 110C. In assembling the casing members 110A-C, two or more casing members 110A-C can be assembled together such that the lower portion (e.g., 130A) of a first of the casing members 110A-C may be nestably inserted inside the upper portion (e.g., 120A) of a second of the casing members 110A-C. In such a nested position, the bottom surface (e.g., 140A) of the first of the casing members 110A-C may be closely adjacent the lower portion upper face (e.g., 155A) of the second of the casing members 110A-C and the lip (e.g., 150A) of the first of the casing members 110A-C may be closely adjacent the top face (e.g., 112A) of the second of the casing members 110A-C.

In some embodiments, the exterior radius of the lower exterior surface (e.g., 135A) of the first of the casing members 110A-C may be substantially the same as the interior radius of the upper interior surface (e.g., 124A) of the second of the casing members, thereby forming a close fit and/or interference fit between the first and second of the casing members 110A-C to hold the two together. In some embodiments texturing, ribs, pits, and/or other protuberances and/or indentations may optionally be provided on the exterior surface of the lower portions of the casing members 110A-C and/or the interior surface of the upper portions of the casing members 110A-C to increase friction between the casing members 110A-C when they are assembled. In some embodiments the casing members 110A-C may be at least partially deformable to aid in the nesting between the casing members 110A-C and/or to increase friction between nested of the casing member 110A-C. In some embodiments a gasket may optionally be interposed between two connected casing members 110A-C (e.g., between a lip (e.g., 150A) of a first of the casing members 110A-C and an upper top surface (e.g., 112A) of the casing member 110A-C receiving the first of the casing members 110A-C).

When assembled, the casing members 110A-C form a substantially cylindrical tube and the exterior surfaces of the casing members 110A-C are visible. The nested fit between the casing members 110A-C hold the casing members 110A-C together and place the passageways through each of the casing members 110A-C in flow communication with one another. Accordingly, the casing members 110A-C, when assembled, form a passageway therein that supports the flow of fluid therethrough. The fluid flow will sequentially move through each of the filters 170A-C of the casing members 110A-C to enable filtering of one or more objects in the fluid flow. For example, in some embodiments the filters 170A-C may filter different sized beads utilized in beadworking for making jewelry, sculpture, wall hangings, and/or other art. The upstream attachment 115 may be coupled over top of the lower portion of the casing member 110A and form an interference fit with the lower portion to also place the passageway of the upstream attachment 115 in flow communication with the casing members 110A-C.

Although three casing members 110A-C are illustrated, it is understood that more or fewer casing members 110A-C may be provided. For example, in some embodiments it may only be desirable to sort beads or other objects into two distinct sizes and only two of casing members 110A-C may be utilized. Also, for example, in some embodiments it may be desirable to sort beads or other objects into four distinct sizes and four casing members may be utilized, each having a unique filter. As an example, it may be desirable to sort beads into the following size ranges: (1) less than 2.0 mm, (2) from 2.0 mm to less than 2.6 mm, (3) from 2.6 mm to less than 3.0 mm, and (4) greater than 3.0 mm. In such a scenario, at least four casing members may be assembled and attached to a vacuum source and include: a most upstream casing member having a filter on a lower extent thereof (e.g., across bottom surface 140A) that filters out anything above 3.0 mm, a second most upstream casing member having a filter on a lower extent thereof that filters out anything at or above 2.6 mm, a third most upstream casing member having a filter on a lower extent thereof that filters out anything at or above 2.0 mm, and a fourth most upstream casing member having a filter on a lower extent thereof that filters out anything at or above approximately 0.5 mm.

The vacuum source may then be activated and the attached casing members maneuvered to suck up the beads. Prior to turning the vacuum source off, the sorting device may be positioned such that the most upstream casing member (having a filter that filters out anything above 3.0 mm) is positioned vertically highest and the most downstream casing member (having a filter that filters out anything above 0.5 mm) is positioned vertically lowest. This positioning prevents beads from falling back through the filters in reverse order when the vacuum source is turned off. The vacuum source may then be turned off. Those beads that are greater than 3.0 mm will still be on the table or other surface where the beads were located since the most upstream filter over the bottom surface of the most upstream casing member prevented those beads from being sucked into the sorting device. Those beads that are from 2.6 mm to less than 3.0 mm will be retained in the first most upstream casing member; those beads that are from 2.0 mm to less than 2.6 mm will be retained in the second most upstream casing member; and those beads that are less than 2.0 mm will be retained in the third most upstream casing member. The beads retained in the casing members may be accessed by disassembling the casing members from one another.

Figure 4:
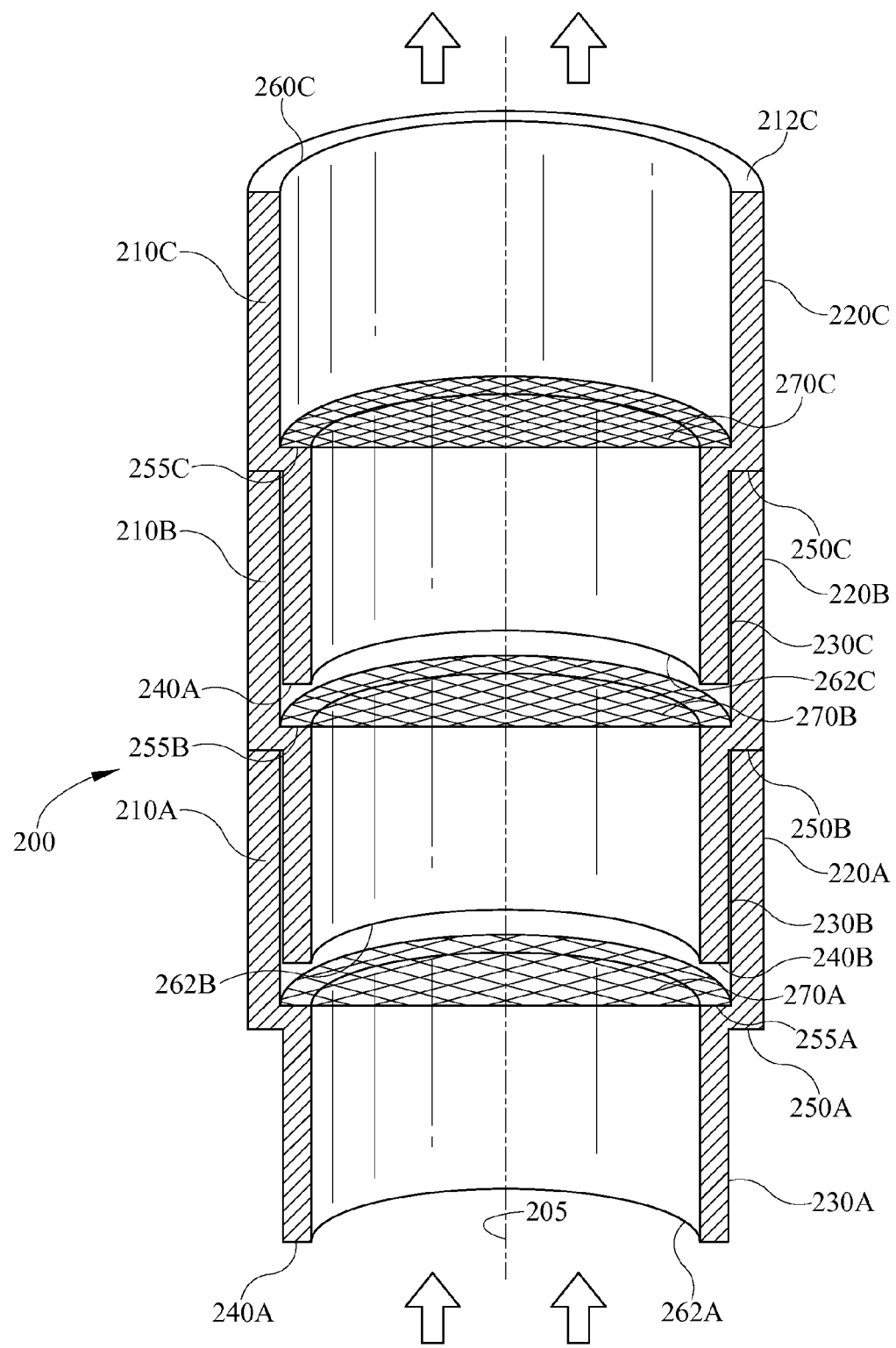
FIG. 4 is a section view of a second embodiment of a sorting device.

Referring now to FIG. 4, a section view of a second embodiment of a sorting device 200 is illustrated. The sorting device 200 includes three casing members 210A-C that are illustrated attached to one another in FIG. 4. The casing members 210A-C share a similar configuration with casing members 110A-C of FIGS. 1 through 3C, with the only distinction being that the filters 270A-C are attached across respective top surfaces 255A-C of respective lower portions 230A-C instead of being attached across the bottom surfaces 240A-C that surround the lower openings 262A-C. The casing members 210A-C are arranged about a longitudinal axis 205. A fluid flow passageway is defined through the casing members 210A-C and extends around the longitudinal axis 205.

The sorting device 200 may be attached to a vacuum or other device to create an air flow through the device in the direction of the illustrated air flow arrows. For example, the upper portion 220C of the casing member 210C may receive a vacuum hose or other vacuum port through the upper opening 260C. The vacuum port may be retained via, for example, an interference fit between the vacuum port and the interior surface of the upper portion 220C. In some embodiments the interior surface of the upper portion 220C may be sized to interface with a standard vacuum hose such as, for example, the American 1¼" standard. In some embodiments a separate adaptor (optionally provided with a filter) may be coupled to the upper portion 220C and adapted for interfacing with a particular vacuum hose or other vacuum port.

The lower portion 230A of casing member 210A may also optionally be coupled to a vacuum attachment if desired. For example, the vacuum attachment may fit around the exterior of the lower portion 230A. The vacuum attachment may be retained via, for example, an interference fit between the vacuum attachment and the exterior surface of the lower portion 230A. In some embodiments the exterior surface of the lower portion 230A may be sized to interface with a standard vacuum attachment such as, for example, the American 1¼" standard. In some embodiments a separate adaptor (optionally provided with a filter) may be coupled to the lower portion 230A and adapted for interfacing with a particular vacuum attachment.

Each of the casing members 210A-C includes an upper portion 220A-C that is substantially cylindrical, includes a top surface 212A-C surrounding an upper opening 260A-C, and includes a bottom lip 250A-C. The lower portions 230A-C of the casing members 210A-C are also substantially cylindrical and each includes a top surface 255A-C and includes a bottom surface 240A-C that surrounds a lower opening 262A-C. The filter member 270A has the largest openings of filter members 270A-C, the filter member 270B has the second largest openings of filter members 270A-C, and the filter member 270C has the smallest openings of filter members 270A-C. Accordingly, objects moving in a fluid flow extending through the passageways of the casing elements 210A-C may be sorted into three different sizes by filters 270A-C. Prior to the fluid flow being removed, the sorting device 200 may be turned upside down (e.g., an orientation that is substantially opposite the orientation illustrated in FIG. 4). The fluid flow may then be removed and the largest objects will be retained in lower portion 230A, the second largest objects will be retained within lower portion 230B and upper portion 230A, and the smallest objects will be retained within lower portion 230C and upper portion 230B. The second largest objects and the smallest objects may be retrieved by disassembling the casing members 210A-C from one another while maintaining the sorting device in the upside down orientation.

When assembled, the casing members 210A-C form a substantially cylindrical tube and the exterior surfaces of the casing members 210A-C are visible. The nested fit between the casing members 210A-C hold the casing members 210A-C together and place the passageways through each of the casing members 210A-C in flow communication with one another. Accordingly, the casing members 210A-C, when assembled, form a passageway therein that supports the flow of fluid therethrough. The fluid flow will sequentially move through each of the filters 270A-C of the casing members 210A-C to enable filtering of one or more objects in the fluid flow. The lips 250C and 250B contact upper surfaces of respective of casing members 210B and 210A. The lip 250A may optionally contact any vacuum attachment that may be connected. In some other embodiments a gap may optionally be provided between the lips 250C and 250B and upper surfaces of respective of casing members 210B and 210A. In some versions of those embodiments a gasket may optionally be provided in between the lips 250C and 250B and upper surfaces of respective of casing members 210B and 210A. Also, the bottom surfaces 240C and 240B are spaced slightly from respective of the lower portion upper surfaces 255B and 255A. In other embodiment the bottom surfaces 240C and/or 240B may extend farther or not as far into the respective upper portions 220B and/or 220A. Although three casing members 210A-C are illustrated, it is understood that more or fewer casing members 210A-C may be provided. Moreover, it is understood that casing members may be arranged as desired to create sorting of objects into any desired plurality of size ranges. In some embodiments casing members may be marked and/or color coded to indicate the characteristics of the filter thereof.

Figure 5A:
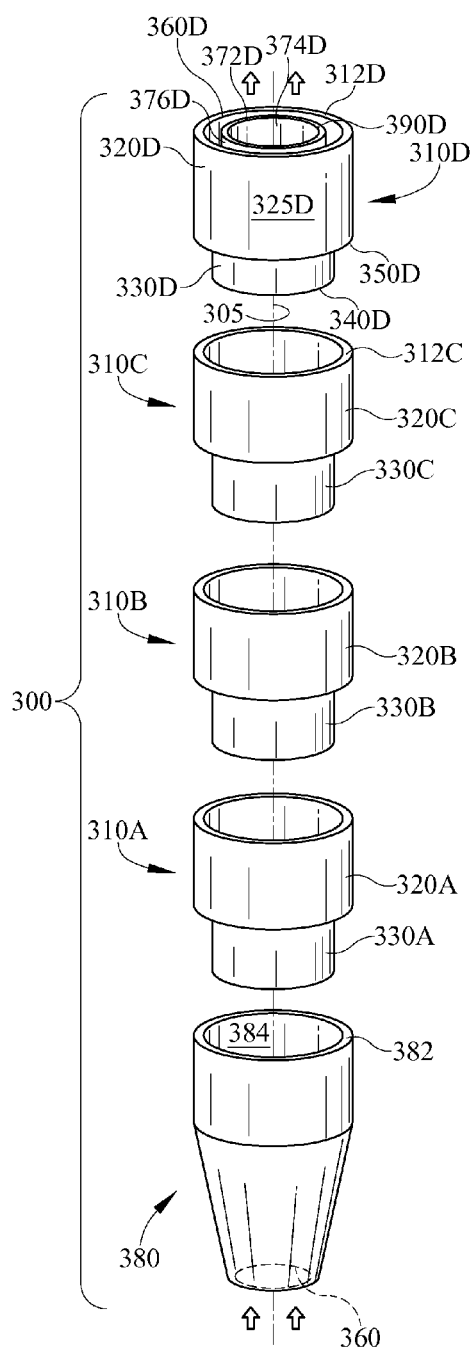
FIG. 5A is an exploded view of a third embodiment of a sorting device.

Referring now to FIG. 5A, an exploded view of a third embodiment of a sorting device 300 is illustrated. The sorting device 300 includes four casing members 310A-D each having an upper portion 320A-D, a lower portion 330A-D, and an airflow passageway extending therethrough from a lower end to an upper end along the longitudinal axis 305. The lower portion 330D may be nestably received in the upper portion 320C, the lower portion 330C may be nestably received in the upper portion 320B, and the lower portion 330B may be nestably received in the upper portion 320A. The lower portion 330A may be nestably received in a frustoconical vacuum attachment 380 such that the exterior surface of the lower portion 330A contacts an interior surface 384 of the vacuum attachment 380. Each of the casing members 310A-D may optionally include a filter. For example, each of the casing members 310A-D may include a filter across the airflow passageway near the juncture of respective of the lower portions 330A-D and the upper portions 320A-D. In some embodiments where casing member 310D includes a filter, the filter may be a filter configured to allow airflow and fine particulates to pass therethrough, but blocking all beads that are greater than a predetermined size such as, for example, 1.0 mm. The frustoconical vacuum attachment 380 includes a passageweay therein extending between an upper opening 382 and a narrower lower opening 360.

The casing 310D has a top surface 312D, an upper portion outer surface 325D, a lower portion bottom surface 340D, a lip 350D, an outer opening 360D, and an inner member having an inner member top surface 372D, an inner member inner surface 374D, and an inner member outer surface 376D. The inner member has an air passageway therein that is in direct flow communication with the air passageway through lower portion 330D. In some embodiments the area between the inner member and the inner surface of the upper portion 320D may not be in flow communication with the air passageway through the lower portion 330D. The inner member may be configured for attachment to one or more vacuum hoses. For example, in some embodiments the inner member may be sized for a standard vacuum hose to snugly fit thereover and contact the inner member outer surface 376D. Also, for example, in some embodiments the inner member may be tapered outwardly as it moves along the longitudinal axis 305 from the inner member top surface 372D toward the lower portion 330D and may enable for a plurality of vacuum hose sizes to snugly fit thereover and contact the inner member outer surface 376D. For example, the inner member may taper from a diameter of approximately one inch at the inner member top surface 372D to a diameter of approximately two inches near the lower portion 330D. Also, for example, the inner member may stair step from a diameter of approximately one inch at the inner member top surface 372D for a portion of the length along longitudinal axis 305, to a diameter of approximately one and a quarter inches for a portion of the length along longitudinal axis 305, then to a diameter of approximately one and a half inches for a portion of the length along longitudinal axis 305.

It is understood that the inner member may be omitted from the casing member 310D in some embodiments. For example, in some embodiments the interior and/or the exterior surface of the upper surface 320D may be configured to interface with one or more vacuum hoses and/or other vacuum port. Also, one of ordinary skill in the art, having had the benefit of the present disclosure, will recognize and appreciate that alternative and/or additional vacuum port attachment structures may be provided. Such alternative or additional structures may be configured to interface with a standard vacuum port and/or with a non-standard vacuum port. It is also understood that the vacuum attachment 380 may be omitted in some embodiments and/or other vacuum attachments may optionally be utilized.

Figure 5B:
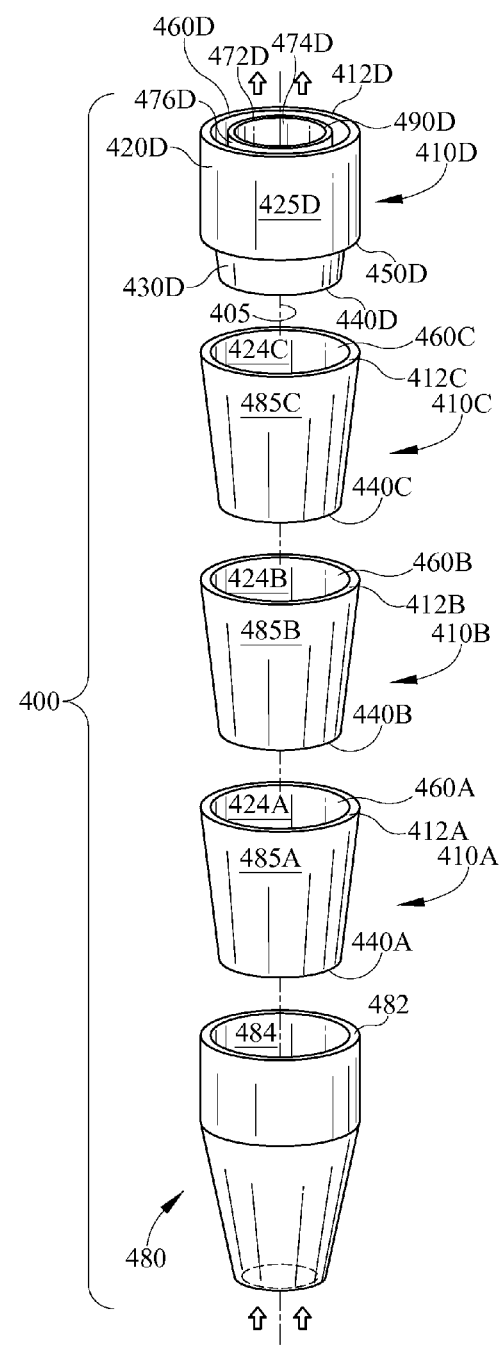
FIG. 5B is an exploded view of a fourth embodiment of a sorting device.

Referring now to FIG. 5B, an exploded view of a fourth embodiment of a sorting device 400 is illustrated. The sorting device 400 includes four casing members 410A-D. The tapered lower portion 430D of casing member 410D may be nestably received through the opening 460C and be in interference fit with the interior surface 424C of the casing member 410C. A portion of the casing member 410C may be nestably received through the opening 460B and be in interference fit with the interior surface 424B of the casing member 410B and a portion of the casing member 410B may be nestably received through the opening 460A and be in interference fit with the interior surface 424A of the casing member 410A. A portion of the casing member 485A may be nestably received in a frustoconical vacuum attachment 480 such that the exterior surface 485A contacts an interior surface 484 of the vacuum attachment 480 prior to the casing member 485A being fully received in the vacuum attachment 480. The casing members 410A-C include tapered exterior surfaces 485A-C and tapered interior surfaces 424A-C. In some embodiments the interior surfaces 424A-C may be tapered more aggressively than the exterior surfaces 485A-C, thereby causing the casing member 410C to be frictionally stopped by the casing member 410B prior to being fully received therein and to cause the casing member 410B to be frictionally stopped by the casing member 410A prior to being fully received therein. In some embodiments the casing members 410A-C may optionally include one or more protrusions on an interior surface thereof to prevent progression of a received casing member 410A-D beyond a certain point within the casing members 410A-C.

Each of the casing members 410A-D may optionally include a filter. For example, each of the casing members 410A-D may include a filter across the bottom surface of the lower portion 440A-D thereof. In some embodiments where casing member 410D includes a filter, the filter may be a filter configured to allow airflow and fine particulates to pass therethrough, but blocking all beads that are greater than a predetermined size such as, for example, 1.0 mm. The frustoconical vacuum attachment 480 includes a passageweay therein extending between an upper opening 482 and a narrower lower opening.

The casing 410D has a top surface 412D, an upper portion outer surface 425D, a lower portion bottom surface 440D, a lip 450D, an outer opening 460D, and an inner member having an inner member top surface 472D, an inner member inner surface 474D, and an inner member outer surface 476D. The inner member has an air passageway therein that is in direct flow communication with the air passageway through lower portion 430D. In some embodiments the area between the inner member and the inner surface of the upper portion 420D may not be in flow communication with the air passageway through the lower portion 430D. The inner member may be configured for attachment to one or more vacuum hoses or other vacuum port.

Figure 6A:
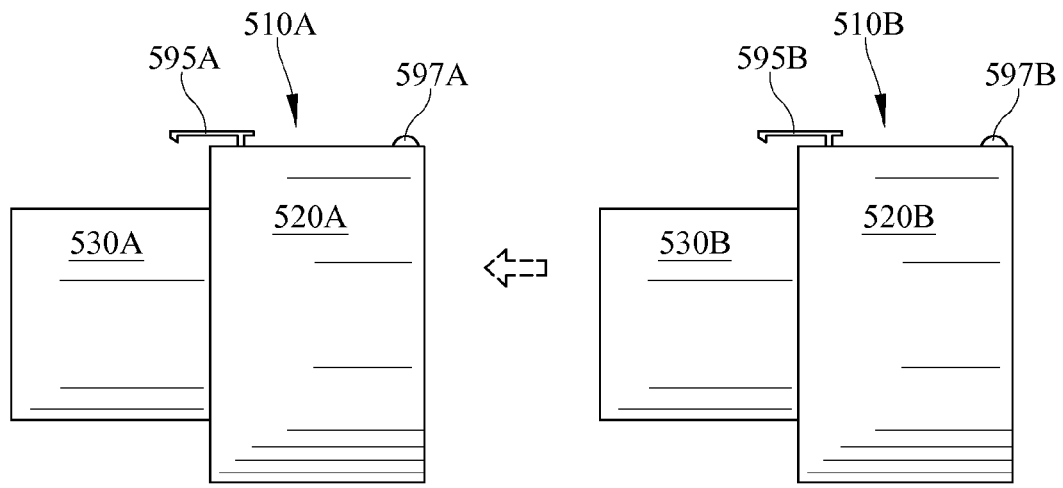
FIG. 6A illustrates two casing members of a fifth embodiment of a sorting device that are unattached from one another.
Figure 6B:
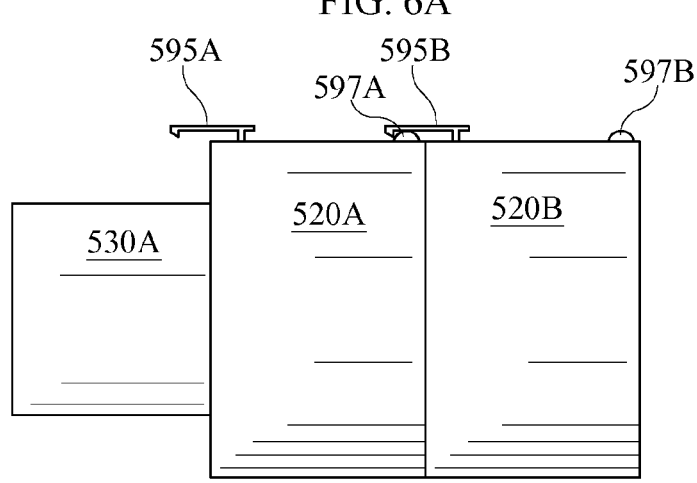
FIG. 6B illustrates the two casing members of FIG. 6A with the casing members attached to one another.

FIG. 6A illustrates two casing members 510A, 510B of a fifth embodiment of a sorting device that are unattached from one another and FIG. 6B illustrates the two casing members 510A, 510B attached to one another. The casing members 510A, 510B each include an upper portion 520A, 520B, and a lower portion 530A, 530B. The lower portion 530B of casing member 510B may be received in the upper portion 520A of casing member 510A and the lower portion 530A of casing member 510A may be received in the upper portion 520B of casing member 510B. Each of the casing members 510A, 510B include a cantilever 595A, 595B extending from the upper portion 520A, 520B so that at least a portion of the cantilevers 595A, 595B overhangs respective of the lower portions 530A, 530B. Each of the casing members 595A, 595B also includes a raised rounded protrusion 597A, 597B toward a top surface of the upper portion 530. When the casing members 510A, 510B are attached to one another, one of the cantilevers 595A, 595B will engage one of the protrusions 597A, 597B to help maintain the casing members 510A, 510B in the attached state. For example, as illustrated in FIG. 6B, cantilever 595B may engage protrusion 597A.

Figure 6C:
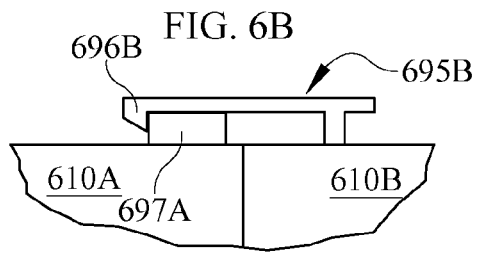
FIG. 6C illustrates a close up view of another embodiment of an attachment structure that may be utilized in connecting two casing members.
Figure 6D:
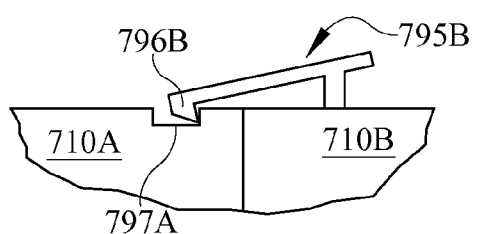
FIG. 6D illustrates a close up view of another embodiment of an attachment structure that may be utilized in connecting two casing members.

FIG. 6C illustrates a close up view of another embodiment of an attachment structure that may be utilized in connecting two casing members 610A and 610B. The attachment structure includes a cantilever 695B extending from the casing member 610B that has a protrusion 696B that extends over and engages a rectangular protrusion 697A extending from the casing member 610A. FIG. 6D illustrates a close up view of another embodiment of an attachment structure that may be utilized in connecting two casing members 710A and 710B. The attachment structure includes a cantilever 795B extending from the casing member 710B that has a protrusion 796B that extends into and engages a recess 797A in the exterior of the casing member 710A. The attachment structures of FIGS. 6A-6D may optionally be used in addition to or as an alternative to friction fit between two adjoining casing members to maintain the casing members in position relative to one another along at least a longitudinal axis. Although specific attachment configurations are illustrated and/or described herein, one of ordinary skill in the art, having had the benefit of the present disclosure, will recognize and appreciate that in alternative embodiments additional and/or alternative attachment structure may be utilized to maintain adjoined casing members in position relative to one another. For example, in some embodiments the casing members may be coupled to one another utilizing complimentary screw and thread type structure and/or bayonet type structure.

Figure 7A:
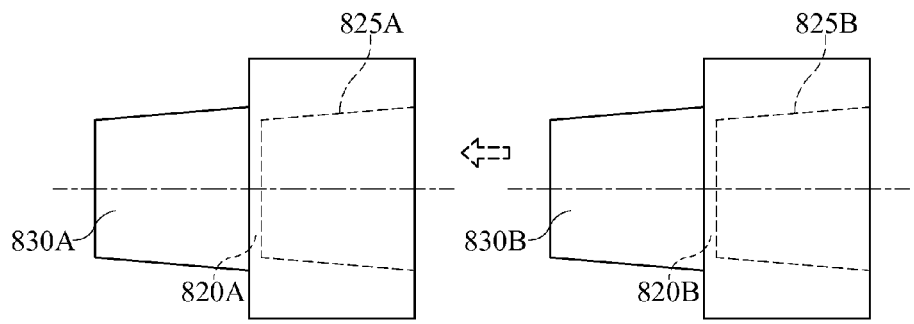
FIG. 7A illustrates two casing members of a sixth embodiment of a sorting device with the casing members unattached from one another.
Figure 7B:
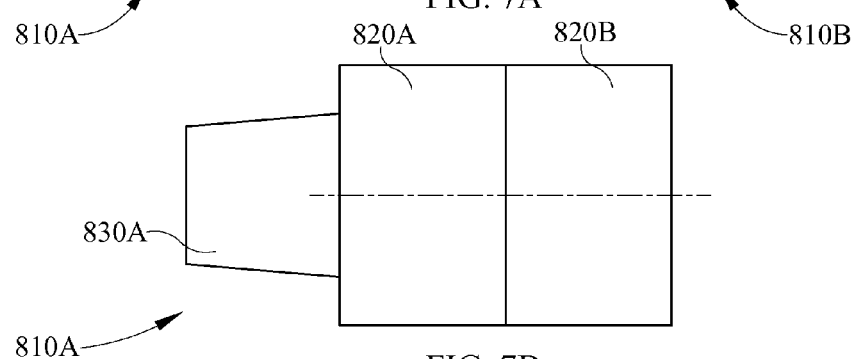
FIG. 7B illustrates the two casing members of FIG. 7A with the casing members attached to one another.

FIG. 7A illustrates two casing members 810A and 810B of a sixth embodiment of a sorting device unattached from one another and FIG. 7B illustrates the two casing members 810A and 810B attached to one another. The casing members 810A, 810B each include a cylindrical upper portion 820A, 820B, and a tapered lower portion 830A, 830B. A passageway extends through each of the casing members 810A, 810B from an upper surface thereof to a lower surface thereof and a filter is provided across the passageway of each of the casing members 810A, 810B. The upper portions 820A, 820B each include a tapered receiving area 825A, 825B therein (illustrated in phantom in FIG. 7A) to snugly receive a respective tapered lower portion 830B, 830A.

Figures 8A, 8B:
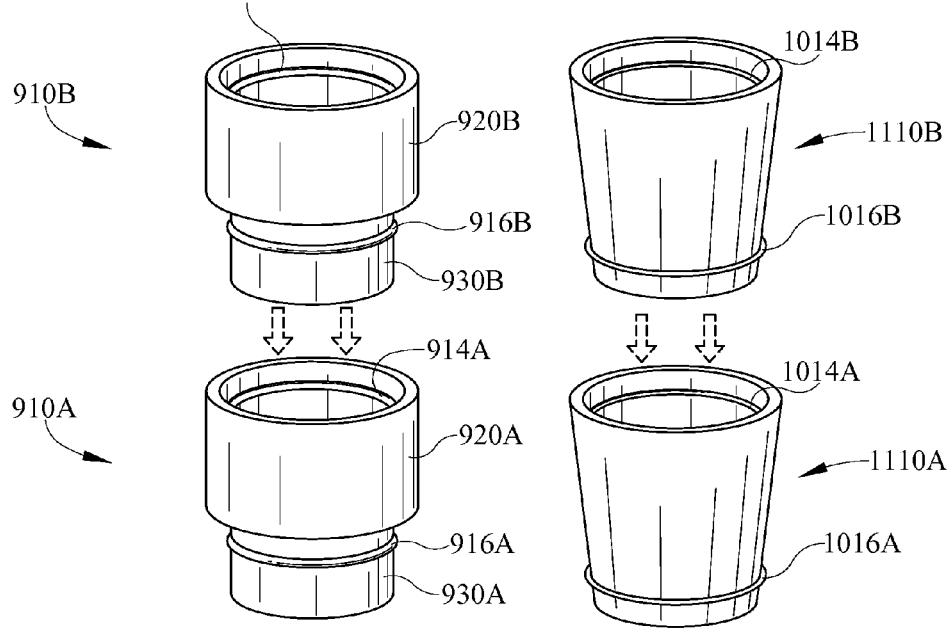
FIG. 8A illustrates two casing members of a seventh embodiment of a sorting device with the casing members unattached from one another.
FIG. 8B illustrates two casing members of an eighth embodiment of a sorting device with the casing members unattached from one another.

FIG. 8A illustrates two casing members 910A and 910B of a seventh embodiment of a sorting device unattached from one another. The casing members 910A, 910B each include an upper portion 920A, 920B, and a lower portion 930A, 930B. A passageway extends through each of the casing members 910A, 910B from an upper surface thereof to a lower surface thereof and a filter is provided across the passageway of each of the casing members 910A, 910B. The lower portion 930B of casing member 910B may be received in the upper portion 920A of casing member 910A and the lower portion 930A of casing member 910A may be received in the upper portion 920B of casing member 910B. The lower portions 930A, 930B each include an annular protrusion 916A, 916B extending from an exterior surface thereof. The upper portions 920A, 920B each include an annular recess 914A, 914B extending along an interior surface thereof. When the lower portion 930B of casing member 910B is received in the upper portion 920A of casing member 910A, the protrusion 916A engages and extends into the recess 914B to help retain the casing members 910A, 910B in axial relation relative to one another. Also, when the lower portion 930A of casing member 910A is received in the upper portion 920B of casing member 910B, the protrusion 916B engages and extends into the recess 914A to help retain the casing members 910A, 910B in axial relation relative to one another. In alternative embodiments the interior surface of the upper portions may optionally be provided with one or more protrusions and the exterior surface of the lower portions may optionally be provided with one or more recesses.

FIG. 8B illustrates two tapered casing members 1010A and 1010B of an eighth embodiment of a sorting device unattached from one another. A passageway extends through each of the casing members 1010A, 1010B from an upper surface thereof to a lower surface thereof and a filter is provided across the passageway of each of the casing members 1010A, 1010B. A portion of the casing member 1010B may be received in a portion of the casing member 1010A and a portion of the casing member 1010A may be received in casing member 1010B. The casing members 1010A, 1010B each include an annular protrusion 1016A, 1016B extending from an exterior surface thereof. The casing members 1010A, 1010B also each include an annular recess 1014A, 1014B extending along an interior surface thereof. When the casing members 1010A, 1010B are attached to one another, the protrusion 1016A or 1016B engages and extends into a respective recess 1014A or 1014B to help retain the casing members 1010A, 1010B in axial relation relative to one another. In alternative embodiments the interior surface may optionally be provided with one or more protrusions and the exterior surface may optionally be provided with one or more recesses.

In use, an individual may serially attach a plurality of casing members to one another. The individual may choose casing members based on the size of objects the individual would like to collect and sort and the groupings of size ranges the individual would like to achieve. By appropriately choosing and arranging the casing members according to the characteristics of each respective filter member, the individual using the sorting device may create a plurality of filtering stages that each allows some objects to pass, while collecting objects larger than a certain size, with each filtering stage collecting smaller objects than the stage immediately upstream from it. The individual may then disassemble the fluid flow operated sorting device to access the contents collected by each stage. Thus, an individual using the fluid flow operated sorting device in conjunction with a vacuum cleaner may sort objects according to size by vacuuming them into the sorting device.

For example, in some embodiments seven casing members may be provided and include: a first blocking anything less than 1.0 mm, a second blocking anything less than 1.5 mm; a third blocking anything less than 2.0 mm; a fourth blocking anything less than 2.5 mm; a fifth blocking anything less than 3.0 mm; a sixth blocking anything less than 3.5 mm; and a seventh blocking anything less than 4.0 mm. If an individual desires to sort beads in 0.5 mm increments from 1.0 mm to 4.0 mm, then the individual may sequentially attach the first though seventh casing members in order, and attach them to a vacuum source so that the seventh blocking member is the most upstream. If, instead, an individual desires to sort beads in 1.0 mm increments from 1.0 mm to 4.0 mm, then the individual may sequentially attach the first, third, fifth, and seventh casing members in order, and attach them to a vacuum source so that the seventh blocking member is the most upstream. The ability to removably attach the casing members in any desired order with any amount of casing members being sequentially attached to one another provides for flexibility for an individual to tailor the sorting device to a particular situation.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A bead sorting device for attachment to a vacuum port, comprising:

a first casing member having a first casing first end, a first casing second end, a first casing airflow passageway extending from said first casing first end to said first casing second end, and a first filter across said first casing airflow passageway;

wherein said first filter blocks objects that are greater than a first size;

said first casing member defining a first casing first portion having an interior profile along a first portion of said first casing airflow passageway that starts at said first casing first end and defining a first casing second portion having an exterior profile along a second portion of said first casing airflow passageway that starts at said first casing second end;

wherein said interior profile of said first casing first portion and said exterior profile of said first casing second portion are substantially the same;

a second casing member having a second casing first end, a second casing second end, a second casing airflow passageway extending from said second casing first end to said second casing second end, and a second filter across said second casing airflow passageway;

wherein said second filter blocks objects that are greater than a second size, said second size unique from said first size;

said second casing member defining a second casing second portion having an interior profile along a first portion of said second casing airflow passageway that starts at said second casing second end and defining a second casing second portion having an exterior profile along a second portion of said second casing airflow passageway that starts at said second casing second end;

wherein said interior profile of said second casing second portion and said exterior profile of said second casing second portion are substantially the same;

wherein said first casing second portion is receivable within said second casing first portion;

a vacuum port casing member having a vacuum port casing first end, a vacuum port casing second end, and a vacuum port casing airflow passageway extending from said vacuum port casing first end to said vacuum port casing second end;

said vacuum port casing member defining a first vacuum port configured for connecting to said vacuum port and defining a vacuum port first portion nestable with one of said first casing first portion and said second casing second portion;

wherein said first casing member, said second casing member, and said vacuum port casing member are all in a fixed relation interference fit with one another when said first casing second portion is received within said second casing first portion and said vacuum port first portion is nested with one of said first casing first portion and said second casing second portion.

2. The bead sorting device of claim 1, wherein said vacuum port casing member includes a third filter across said vacuum port casing airflow passageway, wherein said third filter blocks objects that are greater than a third size, said third size less than said second size and less than said first size.

3. The bead sorting device of claim 1, wherein said interior profile of said first casing first portion, said exterior profile of said first casing second portion, said interior profile of said second casing second portion, and said exterior profile of said second casing second portion are all tapered.

4. The bead sorting device of claim 1, wherein said interior profile of said first casing first portion, said exterior profile of said first casing second portion, said interior profile of said second casing second portion, and said exterior profile of said second casing second portion all define substantially the same radius.

5. The bead sorting device of claim 1, wherein said first filter is provided across said first casing first end.

6. The bead sorting device of claim 1, wherein said first filter is provided between said first casing first end and said first casing second end.

7. The bead sorting device of claim 1, wherein said exterior profile of said first casing first portion and said exterior profile of said second casing second portion collectively define a continuous smooth exterior profile when said first casing second portion is received within said second casing first portion.

8. The bead sorting device of claim 1, wherein said vacuum port portion includes an inner member surrounded by a cylindrical outer structure.

9. The bead sorting device of claim 1, wherein said first filter is provided between said first casing first end and said first casing second end.

10. The bead sorting device of claim 1, wherein with the exception of said first filter, said second filter, and said third filter, said first casing member, said second casing member, and said vacuum port casing member are the same shape and size.

11. A bead sorting device for attachment to a vacuum port, comprising:
at least three casing members, each of said casing members having a casing first end, a casing second end, a casing airflow passageway extending from said first end to said second end, and a filter in a fixed position across said casing airflow passageway;
wherein said filter of each of said casing members has unique filtering size characteristics;
said at least three casing members being sequentially removably nestably engageable in friction fit with one another;
wherein when said at least three casing members are nested and engaged in friction fit with one another, said at least three casing members are in fixed relation to one another, all said airflow passageways are in flow communication with one another, and said casing members define an outermost surface of said bead sorting device and can be coupled to said vacuum port to draw air through said airflow passageways.

12. The bead sorting device of claim 11, wherein each of said casing members includes a cylindrical upper portion having an inner surface surrounding said casing airflow passageway and defining a first radius along said casing airflow passageway and a cylindrical lower portion having an outer surface surrounding said casing airflow passageway and defining a second radius along said casing airflow passageway, wherein said first radius and said second radius are substantially the same.

13. The bead sorting device of claim 12, wherein when said at least three casing members are nested and engaged in friction fit with one another, only said cylindrical upper portions define said outermost surface of said bead sorting device.

14. The bead sorting device of claim 12, wherein said filter of each of said casing members is provided across said casing airflow passageway adjacent a junction of said cylindrical lower portion and said cylindrical upper portion.

15. The bead sorting device of claim 12, wherein said filter of each of said casing members is provided across said casing airflow passageway in said cylindrical lower portion.

16. The bead sorting device of claim 12, wherein one of said cylindrical lower portion and said cylindrical upper portion is sized to couple with said vacuum port.

17. The bead sorting device of claim 16, wherein one of said cylindrical lower portion and said cylindrical upper portion is sized to couple with a vacuum attachment.

18. A method of sorting beads, the method comprising the steps of:
choosing at least three filtering casing members from a plurality of filtering casing members, each of said at least three filtering casing members including an airflow passageway extending therethrough and a unique filter in a fixed position across said airflow passageway;
nestably connecting said at least three filtering casing members in fixed relation to one another so that said airflow passageways of said at least three filtering casing members are in flow communication with one another and said filters are arranged in order of filtering size;
connecting said airflow passageways of said at least three filtering casing members to a vacuum source;
activating said vacuum source so that an airflow moves from a largest filtering size of said filters to sequentially smaller filtering sizes of said filters and moving nestably connected said at least three filtering casing members to draw a plurality of uniquely sized beads into said airflow passageways of nestably connected said at least three filtering casing members;
orienting nestably connected said at least three filtering casing members so that said largest filtering size of said filters is positioned vertically above all other of said filters, and then deactivating said vacuum source.

19. The method of claim 18, further comprising disconnecting said three filtering casing members from one another to retrieve said beads from within said filtering casing members after orienting nestably connected said at least three filtering casing members so that said largest filtering size of said filters is positioned vertically above all other of said filters, and then deactivating said vacuum source.

20. The method of claim 18, further comprising connecting a vacuum attachment directly to a one of said at least three filtering casing members having said largest filtering size of said filters.

* * * * *